US012622565B2

(12) United States Patent
Hwang et al.

(10) Patent No.: US 12,622,565 B2
(45) Date of Patent: May 12, 2026

(54) FOOD WASTE DISPOSER

(71) Applicant: SAMSUNG ELECTRONICS CO., LTD., Suwon-si (KR)

(72) Inventors: Yongjun Hwang, Suwon-si (KR); Keonpyo Koo, Suwon-si (KR); Kyoungmok Kim, Suwon-si (KR); Jiho Seo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 638 days.

(21) Appl. No.: 17/876,865

(22) Filed: Jul. 29, 2022

(65) Prior Publication Data

US 2023/0096648 A1 Mar. 30, 2023

Related U.S. Application Data

(63) Continuation of application No. PCT/KR2022/010209, filed on Jul. 13, 2022.

(30) Foreign Application Priority Data

Sep. 30, 2021 (KR) ........................ 10-2021-0130417

(51) Int. Cl.

*A47L 15/42* (2006.01)
*B02C 18/00* (2006.01)
*B02C 18/12* (2006.01)

(52) U.S. Cl.

CPC ....... *A47L 15/4225* (2013.01); *A47L 15/4227* (2013.01); *B02C 18/0092* (2013.01); *B02C 18/12* (2013.01); *B02C 2201/063* (2013.01)

(58) Field of Classification Search

CPC ............. A47L 15/4225; A47L 15/4227; B02C 2201/063; B02C 18/12; B02C 18/0092

USPC .......................................................... 210/173

See application file for complete search history.

(56) References Cited

U.S. PATENT DOCUMENTS 7,527,061 B2 5/2009 Kim et al.
2006/0037898 A1* 2/2006 Choi ........................ C02F 1/725 422/243
2020/0018053 A1 1/2020 Nicolov

FOREIGN PATENT DOCUMENTS

BR 112013023834 A2 * 8/2020 ......... A47L 15/0055
CN 106510583 A 3/2017
JP 2001-333876 12/2001
KR 10-0343015 B1 7/2002
KR 10-0365896 B1 12/2002

(Continued)

OTHER PUBLICATIONS

English Translation of BR 112013023834 A1 (Year: 2020).*

(Continued)

*Primary Examiner* — Terry K Cecil
(74) *Attorney, Agent, or Firm* — STAAS & HALSEY LLP

(57) ABSTRACT

A food waste disposer includes a transfer pipe connectable to a dishwasher to transfer washing water containing food waste from the dishwasher, a pump to be installed to the transfer pipe to provide power to transfer the washing water through the transfer pipe, a separation device connectable to the transfer pipe to separate the food waste from the washing water transferred from the transfer pipe, and a storage container detachably coupled to the separation device to receive the separated food waste from the separation device and to dispose the received separated food waste.

14 Claims, 11 Drawing Sheets

(56) References Cited

FOREIGN PATENT DOCUMENTS

| | | | | | |
|---|---|---|---|---|---|
| KR | 10-2006-0031101 | | | 4/2006 | |
| KR | 10-2006-0032469 | | | 4/2006 | |
| KR | 10-0694645 | B1 | | 3/2007 | |
| KR | 10-0739863 | B1 | | 7/2007 | |
| KR | 10-2008-0007981 | | | 1/2008 | |
| KR | 10-2009-0114501 | A | | 11/2009 | |
| KR | 10-2010-0025519 | A | | 3/2010 | |
| KR | 10-2010-0064769 | A | | 6/2010 | |
| KR | 10-0964282 | B1 | | 6/2010 | |
| KR | 10-1214460 | | | 12/2012 | |
| KR | 10-1365155 | B1 | | 2/2014 | |
| KR | 10-1424187 | | | 7/2014 | |
| KR | 10-1470323 | B1 | | 12/2014 | |
| KR | 10-2015-0007845 | A | | 1/2015 | |
| KR | 10-2015-0071903 | A | | 6/2015 | |
| KR | 10-1571034 | | | 11/2015 | |
| KR | 101646204 | B1 | * | 8/2016 | ............. E03C 1/266 |
| KR | 10-2017-0117711 | A | | 10/2017 | |
| KR | 10-1888418 | | | 8/2018 | |
| KR | 10-2020-0082905 | A | | 7/2020 | |

OTHER PUBLICATIONS

English Translation of KR 101646204 B1 (Year: 2016).*

International Search Report dated Nov. 3, 2022 in International Patent Application No. PCT/KR2022/010209 (3 pages; 4 pages translation).

PCT/ISA/237 dated Nov. 3, 2022 in International Patent Application No. PCT/KR2022/010209 (6 pages).

International Search Report dated Aug. 4, 2022 in International Application No. PCT/KR2022/005427.

Written Opinion dated Aug. 4, 2022 in International Application No. PCT/KR2022/005427.

* cited by examiner

FOOD WASTE DISPOSER

CROSS-REFERENCE TO RELATED APPLICATION(S)

This application is a continuation application, under 35 U.S.C. § 111(a), of international application No. PCT/KR2022/010209, filed on Jul. 13, 2022, which claims priority to Korean Patent Application No. 10-2021-0130417, filed on Sep. 30, 2021, in the Korean Intellectual Property Office, the disclosure of which is incorporated by reference herein in its entirety

BACKGROUND

1. Field

The disclosure relates to a food waste disposer, and more particularly to a food waste disposer including an improved structure.

2. Description of Related Art

Generally, a food waste disposer is a device for disposing of food waste by grinding the food waste.

The operations of the food waste disposer may be classified into a method in which food waste mixed with water is grinded and then discharged with water to a drain pipe, or a method in which food waste is dried, stirred, grinded and then discharged.

Particularly, the food waste disposer that drying and disposing of food waste includes a grinding device for stirring and grinding food waste, and a heat generating device for applying heat to the grinding device so as to dry the food waste in the grinding device. The grinding device includes a grinding case corresponding to a container in which the food waste is stored, and a grinder rotatable inside the grinding case.

As for the food waste disposer that grinds food waste and discharges the grinded food waste together with water, food waste may block a drain pipe, causing water to flow back or food waste remaining in the drain pipe may cause a bad odor.

In addition, as for the food waste disposer that is installed in a separate space to dry, stir, grind and then discharge the food waste, there may be inconvenience in that a user has to directly move the food waste mixed with water to the food waste disposer.

SUMMARY

Therefore, it is an aspect of the disclosure to provide a food waste disposer capable of disposing of food waste mixed with water without separate manual transport.

It is another aspect of the disclosure to provide a food waste disposer capable of separating water and food waste by being connected to a dishwasher, and capable of recirculating the separated water to the dishwasher.

It is another aspect of the disclosure to provide a food waste disposer capable of automatically separating water and food waste by being connected to a sink and a dishwasher, and capable of disposing of the separated food waste.

Additional aspects of the disclosure will be set forth in part in the description which follows and, in part, will be obvious from the description, or may be learned by practice of the disclosure.

In accordance with an aspect of the disclosure, a food waste disposer includes a transfer pipe connectable to a dishwasher to transfer washing water containing food waste from the dishwasher therethrough, a pump to be installed to the transfer pipe to provide power to transfer the washing water through the transfer pipe, a separation device connectable to the transfer pipe so as to separate the food waste from the washing water transferred from the transfer pipe, and a storage container detachably coupled to the separation device to receive the separated food waste from the separation device and to dispose the received separated food waste.

The food waste disposer may further include a circulation pipe connectable to the separation device and a sump of the dishwasher to transfer the washing water separated from the food waste by the separation device to the sump therethrough.

The transfer pipe may be connectable to a tub of the dishwasher to transfer the washing water from the tub to the separation device.

In response to turning on a circulation mode in the dishwasher, the washing water separated from the food waste may be circulated by being introduced into the sump of the dishwasher from the separation device through the circulation pipe, and then being re-introduced into the tub of the dishwasher by a circulation pump of the dishwasher which is connected to the sump.

In response to turning off the circulation mode of the dishwasher, the washing water introduced into the sump may be discharged to a drain member of the dishwasher which is connected to the sump.

The separation device may include a housing, a conveyor screw rotatably installed inside the housing to transfer the separated food waste to the storage container, and a filter arranged between the housing and the conveyor screw to separate water from the food waste and filter the separated water.

The housing may include a housing body, and a discharge nozzle arranged above the storage container, and having an outlet to discharge the separated food waste from the storage container.

The housing body may include an inlet extending in a first direction with respect to the housing body and connectable to the transfer pipe to introduce the transferred washing water, and a liquid discharge tube extending in a second direction which is an opposite direction of the first direction to discharge the water separated by the filter.

The outlet of the discharge nozzle may be formed in a rotation axis direction of the conveyor screw and the liquid discharge tube may be formed in a radial direction of the conveyor screw to rotate the conveyor screw.

The discharge nozzle may include a body coupler coupled to the housing body, and a nozzle including a cross section gradually reduced from the body coupler toward the outlet.

The separation device may further include a motor configured to supply power to the conveyor screw.

The storage container may include an outer housing, and a grinding device detachably installed from an inside of the outer housing to an outside and configured to grind the food waste that is discharged from the separation device.

The separation device may be biasedly mounted to one side of the storage container not to interfere with the grinding device in response to separating the grinding device from the outer housing.

The storage container may further include a deodorizer arranged on one side of the grinding device to suck odors generated by the grinding device and to discharge the odors to the outside.

The transfer pipe may be connected to a drain pipe of a sink to directly transfer the food waste and water from the sink.

In accordance with another aspect of the disclosure, a food waste disposer includes a transfer pipe connectable to a drain pipe of a sink to transfer washing water including food waste from the sink, a pump mountable to the transfer pipe to provide power for transferring the washing water through the transfer pipe, a separation device connectable to the transfer pipe to separate the food waste from the washing water transferred from the transfer pipe, and a storage container detachably coupled to the separation device to receive the separated food waste from the separation device and to dispose the received separated food waste.

The separation device may include an inlet coupled to the transfer pipe to introduce the washing water through the transfer pipe, a discharge nozzle including an outlet through which the separated food waste is discharged to the storage container, and a liquid discharge tube arranged below the discharge nozzle and through which the water is discharged.

The separation device may further include a conveyor screw configured to be rotatable to transfer the separated food waste toward the outlet of the discharge nozzle, and a filter arranged in a circumferential direction of the conveyor screw to separate the water from the food waste.

In accordance with another aspect of the disclosure, a food waste disposer includes a transfer pipe connectable to a drain pipe of a sink and to a tub of a dishwasher respectively to transfer washing water including food waste discharged from the sink and to transfer washing water including food waste discharged from the dishwasher, a pump mountable to the transfer pipe to provide power to transfer the washing water by pump the washing water through the transfer pipe, a separation device connectable to the transfer pipe to separate the food waste from the washing water transferred from the transfer pipe, and a storage container to which the separation device is coupled to one side thereof, the storage container including a grinding device configured to grind the separated food waste discharged from the separation device.

The storage container may further include an outer housing, and the separation device may be placed inside the outer housing and detachably coupled to the outer housing.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
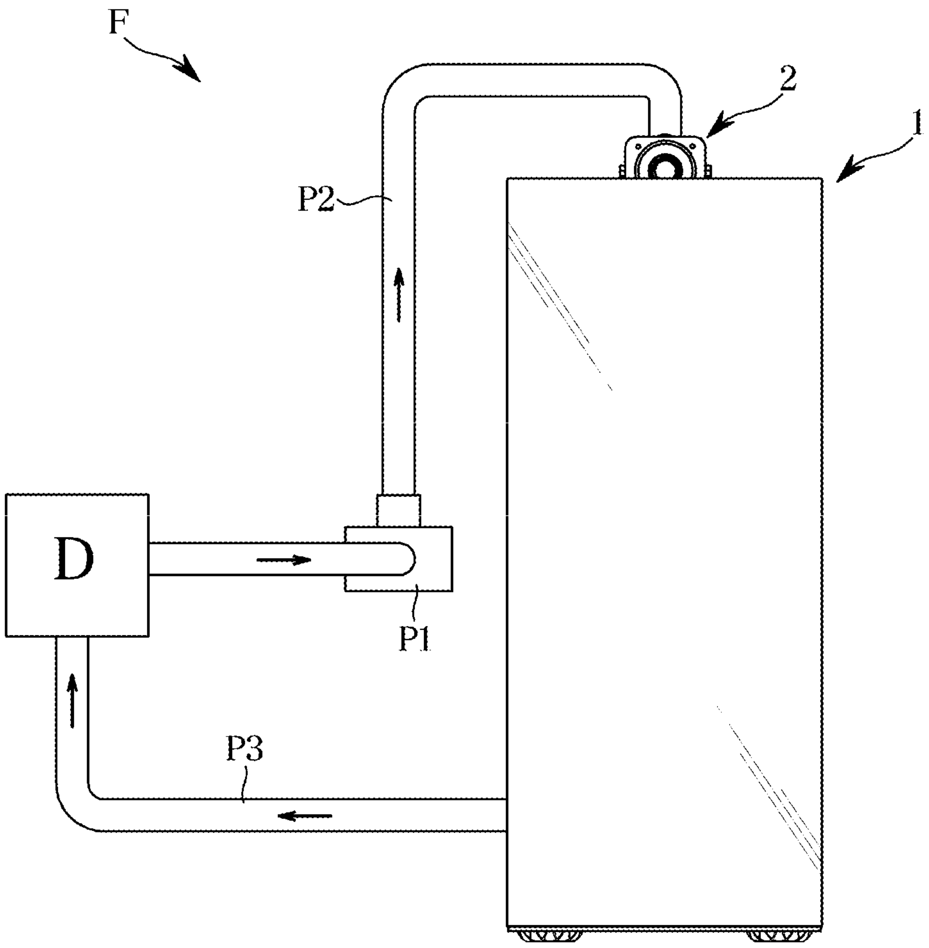
FIG. 1 is a front view schematically illustrating a food waste disposer according to an embodiment of the disclosure.

Embodiments described in the disclosure and configurations shown in the drawings are merely examples of the embodiments of the disclosure, and may be modified in various different ways at the time of filing of the present application to replace the embodiments and drawings of the disclosure.

In addition, the same reference numerals or signs shown in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element.

The disclosure will be described more fully hereinafter with reference to the accompanying drawings.

Figure 2:
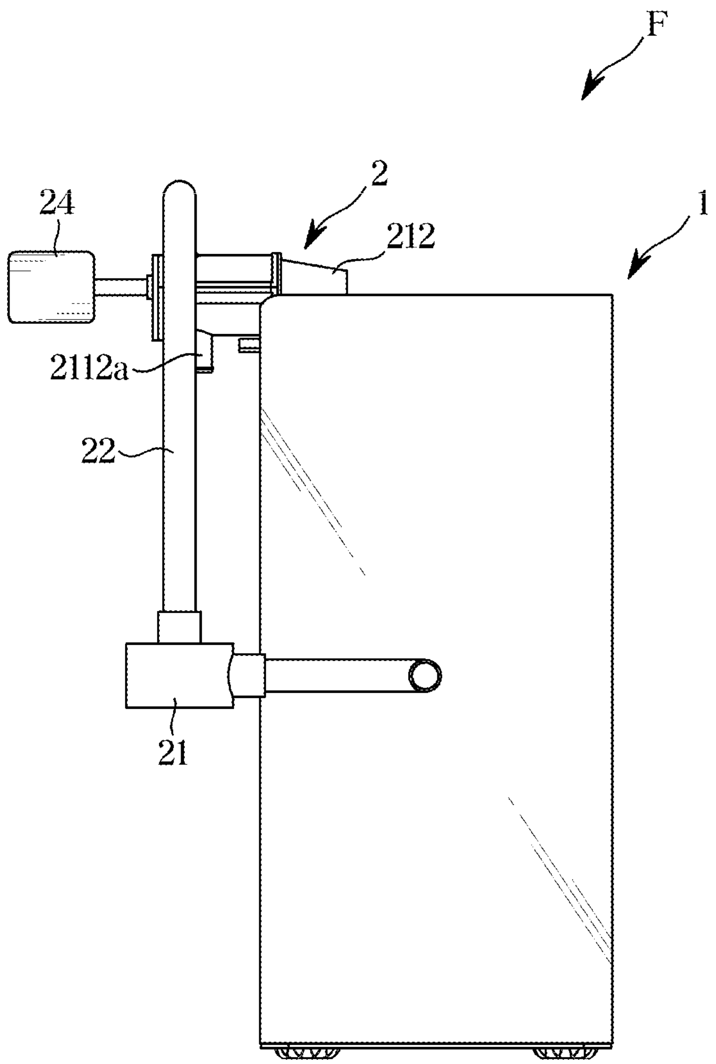
FIG. 2 is a side view schematically illustrating the food waste disposer according to an embodiment of the disclosure.

FIG. 1 is a front view schematically illustrating a food waste disposer according to an embodiment of the disclosure. FIG. 2 is a side view schematically illustrating the food waste disposer according to an embodiment of the disclosure.

Referring to FIGS. 1 and 2, a food waste disposer according to an embodiment of the disclosure may be connected to a dishwasher D.

The food waste disposer F may include a transfer pipe P2 connected to the dishwasher D.

The dishwasher D is provided to accommodate dishes therein, and washing water of the dishwasher D may be contaminated in a process of washing the accommodated dishes.

Particularly, the washing water of the dishwasher D may include food waste and water as the dishes are washed.

The food waste and water may be transferred to the transfer pipe P2 of the food waste disposer F.

The food waste disposer F may include a pump P1 mounted on the transfer pipe P2.

The pump P1 may be configured to provide power to transfer food waste and water to the transfer pipe P2. The pump P1 may be mounted in the middle of the transfer pipe P2 as shown in FIGS. 1 and 2. However, a position of the pump P1 is not limited thereto, and the pump P1 may be mounted on an upstream side-end of the transfer pipe P2 or a downstream-end of the transfer pipe P2.

The food waste disposer F may include a separation device 2 connected to the transfer pipe P2 to separate food waste and water from the dishwasher D. The food waste disposer F may include a storage container 1 in which food waste is discharged from the separation device 2 and stored.

Food waste and water transferred to the transfer pipe P2 by the pump P1 may be introduced into the separation device 2. The separation device 2 may be mounted above the storage container 1. Particularly, a discharge nozzle 212 of the separation device 2 may be arranged on the upper side of the storage container 1.

The separation device 2 may include a motor 24 configured to rotate a conveyor screw 22 to be described later. Details of the separation device 2 will be described later.

Food waste, which is separated from the water and discharged from the separation device 2, may be introduced into the storage container 1 through an open upper surface of the storage container 1. The food waste separated by the separation device 2 may be stored in the storage container 1 by gravity.

However, the disclosure is not limited thereto. Alternatively, as an outlet 2121 of the separation device 2 is connected to one end of a discharge pipe, and the other end of the discharge pipe is arranged inside the storage container, food waste may be introduced into the storage container 1 through the discharge pipe.

In addition, although not shown, a cover member (not shown) provided to open and close a part of the separation device 2 and the open upper surface of the storage container 1 may be provided. By the cover member (not shown), it is possible to prevent odors, caused by the food waste, from leaking to the outside.

The cover member (not shown) may be rotatably coupled to the storage container 1 using a hinge, coupled to the storage container 1 in a sliding manner, or detachably provided without being coupled to the storage container 1.

The food waste disposer F may include a circulation pipe P3 connected to the separation device 2 and provided to introduce water into the dishwasher D.

Food waste separated from water may be introduced into the storage container 1 from the separation device 2 and dried, grinded and stored in the storage container 1 as described above.

At the same time, the water separated from the food waste may be introduced back into the dishwasher D from the separation device 2. Particularly, the water separated by the separation device 2 may be introduced into the dishwasher D through the circulation pipe P3. One end of the circulation pipe P3 may be connected to a liquid discharge tube 2112*a* (refer to FIG. 6), described later, of the separation device 2 and the other end of the circulation pipe P3 may be connected to a sump 32 (refer to FIG. 7) of the dishwasher D.

Water introduced into the dishwasher D may pass through a circulation process and then be finally drained from the sump 32 (refer to FIG. 7) of the dishwasher D. Details related to the circulation of the food waste disposer F and the dishwasher D will be described later.

Figure 3:
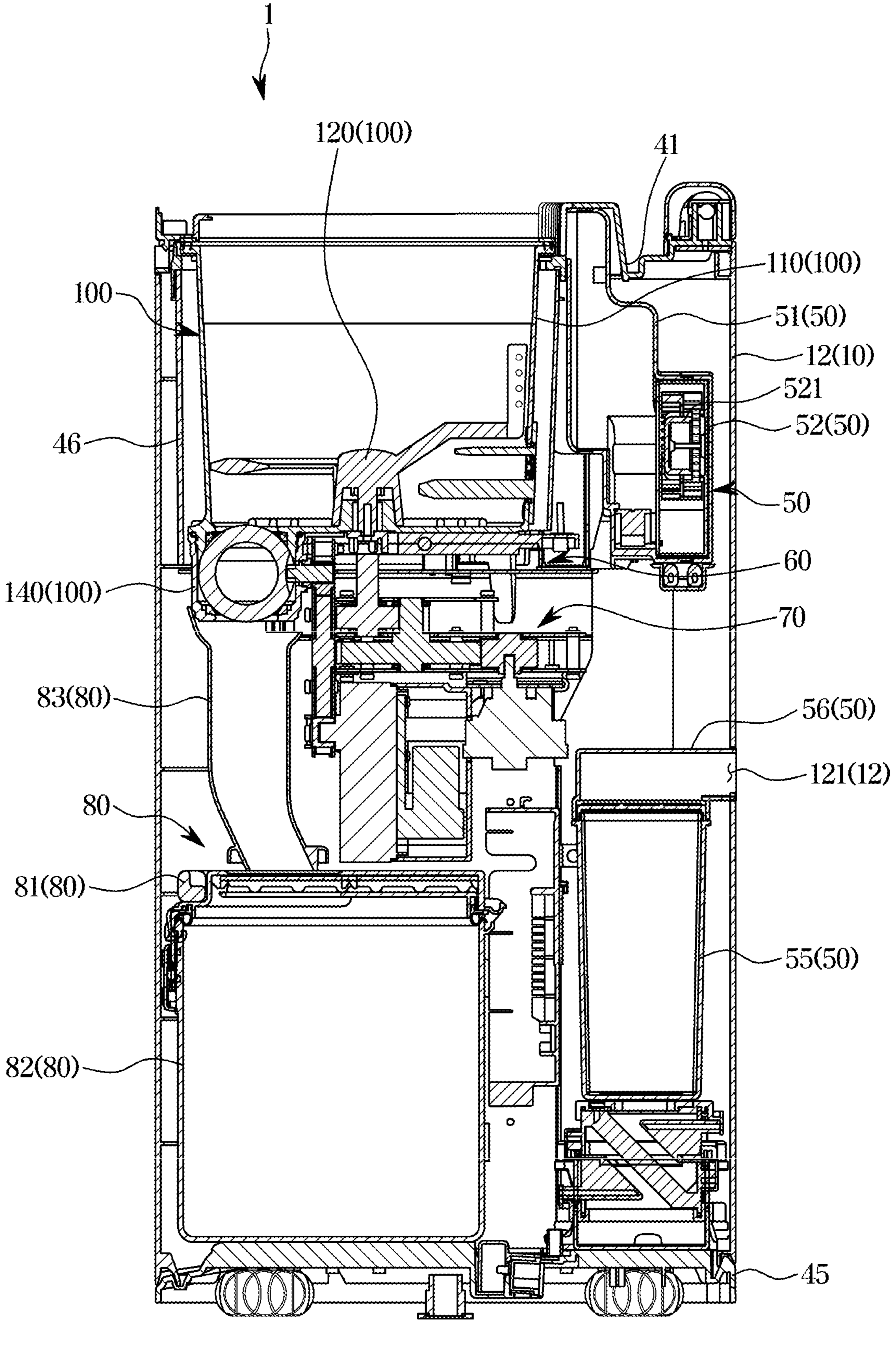
FIG. 3 is a cross-sectional view illustrating a storage container of the food waste disposer shown in FIG. 1.
Figure 4:
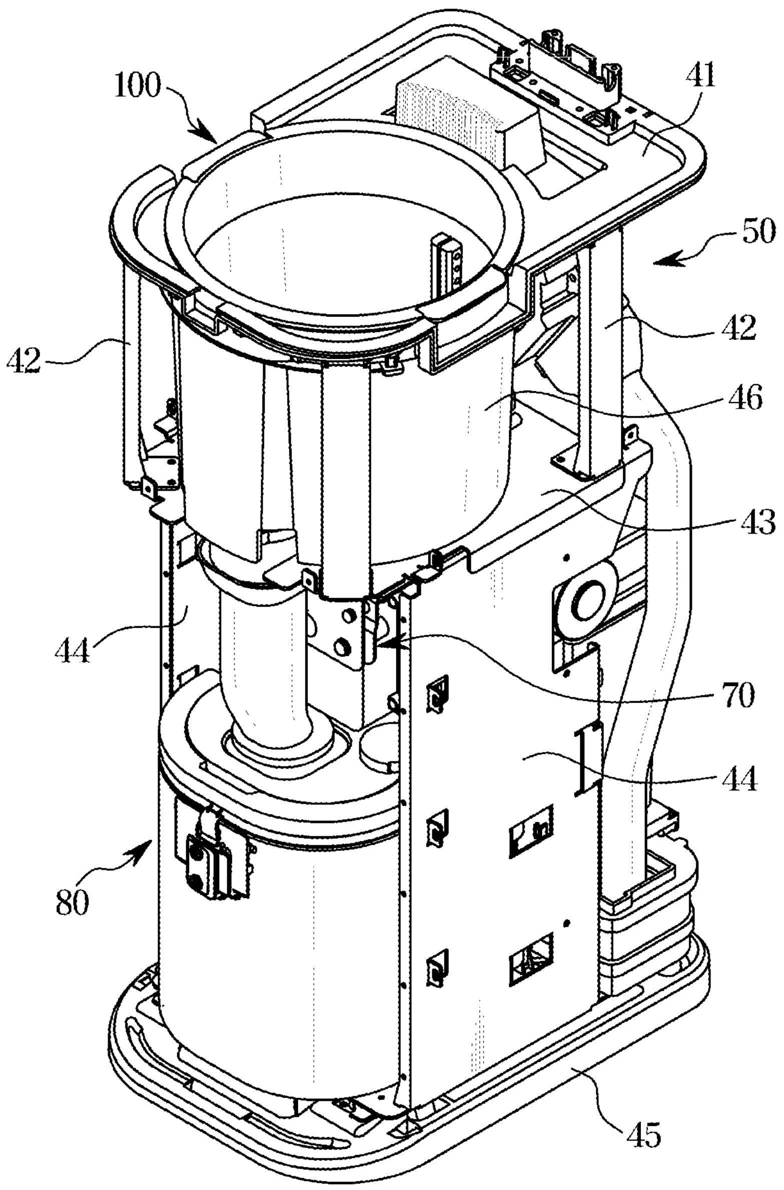
FIG. 4 is a perspective view illustrating the storage container of FIG. 3 in which an outer housing is removed.
Figure 5:
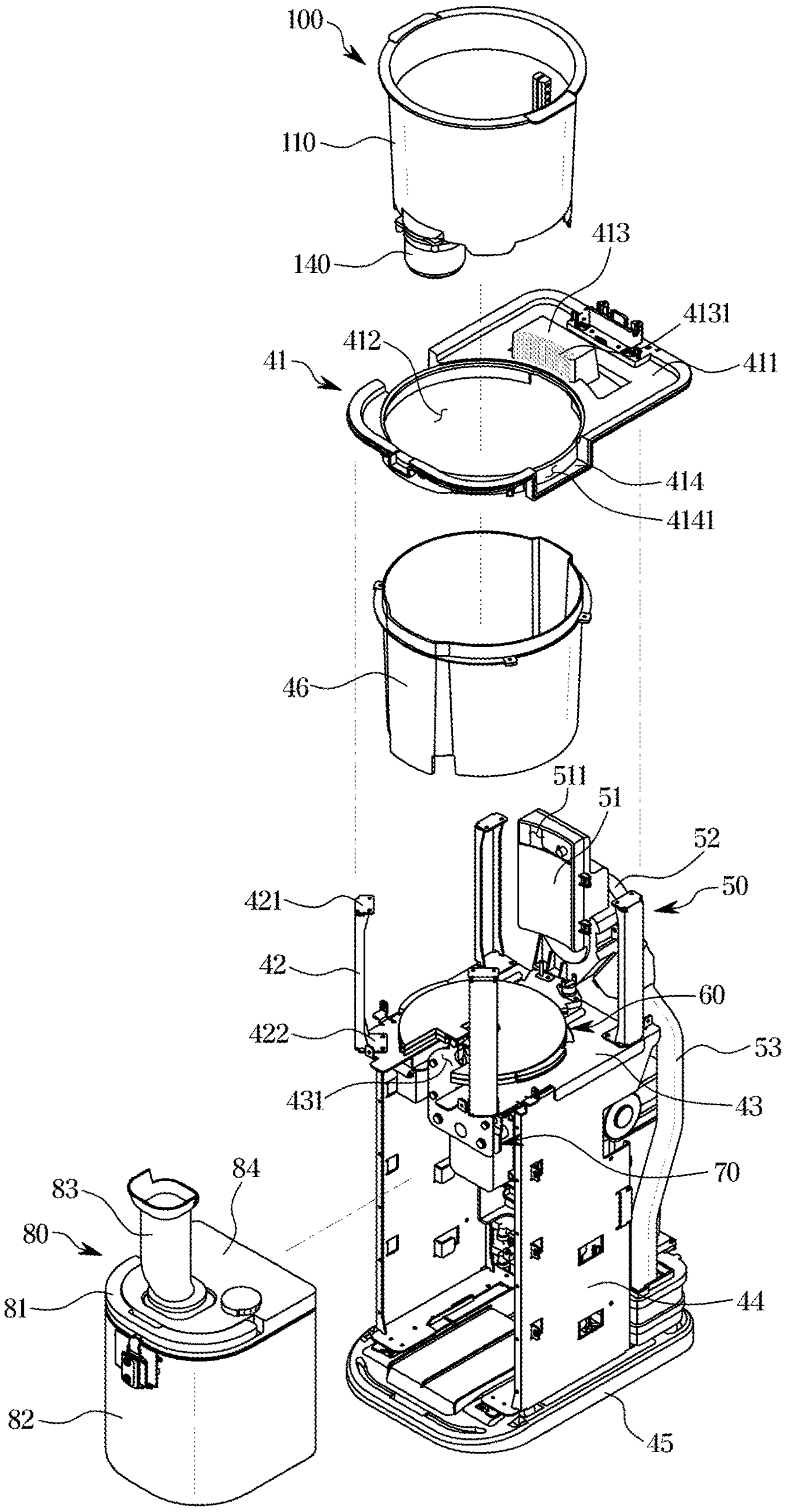
FIG. 5 is an exploded perspective view of FIG. 4.

FIG. 3 is a cross-sectional view illustrating a storage container of the food waste disposer shown in FIG. 1. FIG. 4 is a perspective view illustrating the storage container of FIG. 3 in which an outer housing is removed. FIG. 5 is an exploded perspective view of FIG. 4.

Hereinafter a detailed structure of the storage container 1 of the food waste disposer F according to an embodiment will be described with reference to FIGS. 3 to 5.

Referring to FIG. 3, the storage container 1 may include a heat generator 60.

The heat generator 60 may be arranged below the grinding device 100 so as to heat the grinding device 100. Particularly, the heat generator 60 may include a heating wire receiving frame in which a heating wire is accommodated. The heating wire receiving frame may be arranged below a grinding case 110 of the grinding device 100.

The grinding device 100 may be arranged inside a receiving frame 46 fixed to the inside of an outer housing 10. In addition, the heat generator 60 may also be arranged inside the receiving frame 46.

The receiving frame 46 may be provided to cover the outside of the grinding device 100 and the heat generator 60 so as to allow the grinding device 100 and the heat generator 60 to be more stably supported and accommodated inside the storage container 1.

The storage container 1 may include a drive device 70.

The drive device 70 may be arranged below the grinding device 100 and the heat generator 60. The drive device 70 may be configured to transmit power to the grinding device 100.

Particularly, the drive device 70 may be configured to transmit power to a rotary grinder 120 of the grinding device 100 to be described later and to transmit power to a valve assembly 140 of the grinding device 100, respectively.

Opposite sides of the drive device 70 may be supported by side frames 44 to be described later and fixed to the lower portion of the grinding device 100.

The storage container 1 may include a deodorizer 50.

The deodorizer 50 may be configured to suck in odors such as bad smell generated from the grinding device 100. The odors sucked into the deodorizer 50 may be filtered and discharged back to the outside of the storage container 1.

Particularly, the deodorizer 50 may be arranged on the upper side of the grinding device 100 so as to suck the odor. Accordingly, the deodorizer 50 may be arranged at the rear of the grinding device 100.

The storage container 1 may include a storage device 80.

The storage device 80 may be provided to allow food waste, which is dried and grinded in the grinding device 100, to be transferred and stored.

Particularly, the storage device 80 may include a transfer duct 83 connected to the valve assembly 140 of the grinding device 100.

The valve assembly 140 of the grinding device 100 may be configured to open and close a discharge member of the grinding case 110.

In response to opening the discharge member of the grinding case 110 by the valve assembly 140, the grinded food waste inside the grinding case 110 may be transferred to a storage case 82 of the storage device 80 by passing through the transfer duct 83.

Referring to FIGS. 4 and 5, the storage container 1 according to an embodiment of the disclosure may include a plurality of frames provided to support the grinding device 100, the deodorizer 50, the storage device 80, and the drive device 70.

The storage container 1 may include an upper frame 41. The grinding device 100 may be inserted into the front of the upper frame 41.

The upper frame 41 may include a base 411. The base 411 may be provided to form an upper surface of the upper frame 41.

The upper frame 41 may include an opening 412 formed in front of the base 411. The grinding device 100 may be installed to be detachable to the outside of the outer housing 10 through the opening 412. In addition, the opening 412 may be provided with a size corresponding to the open upper surface of the grinding device 100.

Accordingly, a user can put the food waste into the grinding device 100 through the opening 412. That is, the opening 412 may be provided as a kind of inlet. The cover member may be provided to open and close the opening 412 of the upper frame 41.

The upper frame 41 may include a suction member 413 provided at the rear of the opening 412. The suction member 413 may protrude upward from the base 411 of the upper frame 41.

The suction member 413 may be provided to accommodate a portion of the deodorizer 50. Particularly, a part of an upper portion of a communication case 51 of the deodorizer 50 may be accommodated in the suction member 413.

A communication hole 4131 communicating with the grinding device 100 may be formed in the suction member 413 of the upper frame 41. The communication hole 4131 may be provided in plurality.

Accordingly, air of the grinding device 100 may flow to the suction member 413 through the communication hole 4131 of the upper frame 41 by a suction force generated from the deodorizer 50, and the air flowing to the suction member 413 may flow to the inside of the communication case 51 of the deodorizer 50.

The upper frame 41 may include a depression 414 provided on opposite sides thereof. The depression 414 may be provided to be bent downward from the base 411 of the upper frame 41. The depression 414 may form a holding space 4141 therein.

Accordingly, a handle of the grinding device 100 is arranged in the depression 414, and thus a user can easily grip the handle upon separating the grinding device 100.

The storage container 1 may include the receiving frame 46.

The receiving frame 46 may be provided to accommodate the grinding device 100 therein. The receiving frame 46 may be arranged under the upper frame 41.

The receiving frame 46 may be provided in a substantially cylindrical shape in which an upper portion and a lower portion are opened.

The storage container 1 may include a bottom frame 43.

The bottom frame 43 may be provided to allow the receiving frame 46 to be mounted thereto. The heat generator 60 may be arranged on the upper side of the bottom frame 43. A cutout 431 may be formed in front of the bottom frame 43.

Accordingly, the grinding case 110 of the grinding device 100 may be arranged on the upper side the heat generator 60 but the valve assembly 140 protruding downward from the grinding device 100 may pass through the bottom frame 43 so as to be arranged in front of the bottom frame 43.

The storage container 1 may include a support frame 42. The support frame 42 may be provided in plurality so as to support the upper frame 41. Although four support frames 42 are illustrated in FIG. 5, the number of support frames 42 is not limited thereto.

The support frame 42 may include an upper supporter 421 provided on an upper portion of the support frame 42 so as to support the upper frame 41. In addition, the support frame 42 may include a bottom mounter 422 provided at a lower portion of the support frame 42 and mounted on the bottom frame 43.

The support frame 42 may be provided in a substantially rod shape to support the upper frame 41 while occupying a minimum space.

The storage container 1 may include the side frame 44 and a base frame 45 forming a bottom surface. The side frames 44 may be provided as a pair.

The side frame 44 may be arranged under opposite sides of the bottom frame 43. The side frame 44 may be arranged between the bottom frame 43 and the base frame 45.

The side frame 44 may include a side body covering opposite sides of the storage device 80.

The side frame 44 may include a drive device support bent inwardly of the side body and coupled to the bottom frame 43.

The storage device 80 may receive the dried and grinded food waste from the grinding device 100 through the transfer duct 83. The storage device 80 may include a storage case 82. The storage case 82 may be connected to the transfer duct 83 to store the grinded food waste.

The storage device 80 may include a case cover 84 provided above the storage case 82. A grip 81 provided to be gripped may be mounted on the front of the case cover 84.

The deodorizer 50 may include the communication case 51.

The communication case 51 may be arranged at the rear of the grinding device 100. Particularly, a part of an upper portion of the communication case 51 may be accommodated in the suction member 413 of the upper frame 41.

The communication case 51 may include an intake hole 511 cut out from a front surface. Moisture or odors generated inside the grinding device 100 may be introduced into the communication hole 4131 formed in the suction member 413 of the upper frame 41 and the intake hole 511 of the communication case 51.

The deodorizer 50 may include a fan mounting case 52.

The fan mounting case 52 may be connected to the communication case 51. The fan mounting case 52 may be provided to form a suction airflow from the grinding device 100 toward the communication case 51.

A blowing fan 521 may be arranged inside the fan mounting case 52 to generate a suction force.

The deodorizer 50 may include a deodorizing duct 53.

The deodorizing duct 53 may be connected to the fan mounting case 52. The deodorizing duct 53 may form a path through which the air introduced into the fan mounting case 52 flows.

The deodorizer 50 may include a duct mounting frame and a filter member 55.

The duct mounting frame may be connected to the deodorizing duct 53. The filter member 55 may be mounted on the upper portion of the duct mounting frame.

A deodorizing filter (not shown) formed of activated carbon may be arranged inside the filter member 55 so as to filter the contaminated air generated in the grinding device 100. The filter member 55 may include a filter case.

The deodorizer 50 may include an exhaust case 56.

The exhaust case 56 may be mounted on one side of the filter member 55 to allow air, which is filtered by the filter member 55, to flow. Particularly, the exhaust case 56 may be mounted on the upper side of the filter member 55.

Accordingly, the filtered air may communicate with an exhaust hole 121 (refer to FIG. 3) of a rear housing 12 of the outer housing 10 through the exhaust case 56, thereby being discharged to the outside.

Figure 6:
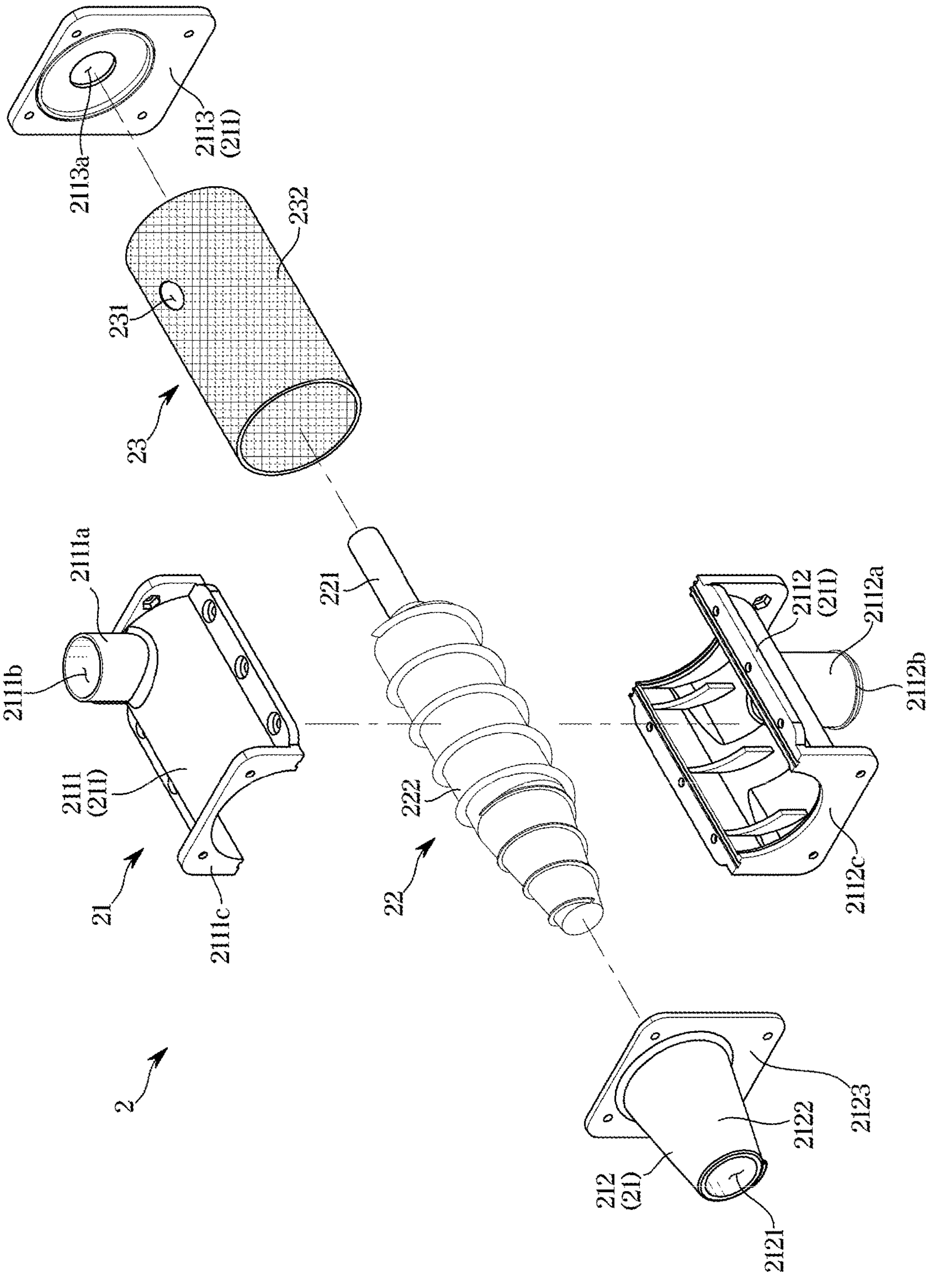
FIG. 6 is an exploded-perspective view illustrating a separation device of the food waste disposer shown in FIG. 1.

FIG. 6 is an exploded perspective view illustrating a separation device of the food waste disposer shown in FIG. 1.

The separation device 2 may be connected to the transfer pipe P2 so as to separate food waste from the washing water of the dishwasher D transferred from the transfer pipe P2.

The separation device 2 may include a housing 21 forming an exterior and a conveyor screw 22 rotatably accommodated in the housing 21. The separation device 2 may include a motor 24 configured to provide power for rotating the conveyor screw 22.

The housing 21 may include a housing body 211 and a discharge nozzle 212 coupled to the front of the housing body 211.

The housing body 211 may include an upper body 2111, a lower body 2112, and a rear body 2113. The upper body 2111 may form a part of an upper portion of the housing body 211, and the lower body 2112 may form a part of a lower portion of the housing body 211. The rear body 2113 may be coupled to the rear of the upper body 2111 and the lower body 2112.

The upper body 2111 may include an inlet member 2111*a* connected to the transfer pipe P2. The inlet member 2111*a* may extend upwardly of the housing body 211. The inlet member 2111*a* may include an inlet 2111*b*.

As the inlet 2111*b* of the inlet member 2111*a* communicates with the inside of the transfer pipe P2, the washing water of the dishwasher D transferred from the transfer pipe P2 may flow into the separation device 2.

The lower body 2112 may include the liquid discharge tube 2112*a* connected to the circulation pipe P3. The liquid discharge tube 2112*a* may extend downwardly of the housing body 211. Particularly, the liquid discharge tube 2112*a* may be provided to extend downwardly of the lower body 2112 to discharge the water separated by a filter 23. The filter 23 may be provided to separate food waste and water from the washing water.

The rear body 2113 may include a screw through hole 2113*a*. A rear end of the conveyor screw 22 may be coupled to the motor 24 by passing through the screw through hole 2113*a* of the rear body 2113. Accordingly, the conveyor screw 22 may receive power from the motor 24.

The upper body 2111 may include an upper flange 2111*c*, and the lower body 2112 may include a lower flange 2112*c*. The upper flange 2111*c* and the lower flange 2112*c* may be coupled to the discharge nozzle 212. The upper flange 2111*c* and the lower flange 2112*c* may include a surface arranged perpendicular to the rotation axis of the conveyor screw 22.

The discharge nozzle 212 may include a nozzle 2122 and a body coupler 2123.

The body coupler 2123 of the discharge nozzle 212 may be coupled to the upper flange 2111*c* of the upper body 2111 and the lower flange 2112*c* of the lower body 2112. The body coupler 2123 of the discharge nozzle 212 may be provided to have a substantially rectangular edge.

The nozzle 2122 may extend toward the storage container 1 from the body coupler 2123. Particularly, the nozzle 2122 may include the outlet 2121. Food waste inside the separation device 2 may be separated from water and discharged to the storage container 1 through the outlet 2121.

The nozzle 2122 may include a cross section that is gradually reduced from the body coupler 2123 toward the outlet 2121.

The conveyor screw 22 may be rotatably provided inside the housing 21 to transfer the food waste toward the storage container 1. The conveyor screw 22 may be rotated based on a rotational axis extending along the front and rear direction of the separation device 2.

The conveyor screw 22 may include a conveying member 222 and a motor coupler 221. The motor coupler 221 may pass through the screw through hole 2113*a* of the rear body 2113 and be coupled to the motor 24 to be rotated.

A part of a rear portion of the conveying member 222 of the conveyor screw 22 may be rotatably arranged inside the housing body 211, and a part of a front portion of the conveyor screw 22 may be rotatably arranged inside the discharge nozzle 212.

The front of the conveyor screw 22 may include a shape corresponding to the discharge nozzle 212, and thus may include a cross-section that is gradually reduced as the conveyor screw 22 becomes near to an end thereof.

Because the discharge nozzle 212 is provided to have a smaller cross section in the direction toward the outlet 2121, the food waste conveyed by the conveyor screw 22 may be compressed inside the discharge nozzle 212. Accordingly, it is possible to more effectively separate water from the food waste.

In other words, because the cross section of the discharge nozzle 212 is provided to become smaller in the direction in which the food waste is transported, an external force, which causes the food waste transported by the conveyor screw 22 to be discharged to the outlet 2121, increases. Accordingly, it is possible to easily discharge the food waste while minimizing the amount of food waste remaining in the separation device 2.

The separation device 2 may include the filter 23 arranged between the housing 21 and the conveyor screw 22 to separate and filter the food waste and the water.

The filter 23 may include a filtering member 232 and a filter hole 231.

The filter hole 231 may be provided to allow washing water, which is introduced through the inlet member 2111*a* formed in the housing body 211, to be introduced into the inside of the filter 23. A size of the filter hole 231 may be provided to correspond to the inlet 2111*b* formed in the inlet member 2111*a*. However, the size of the filter hole 231 is not limited thereto, and may be provided to be larger or smaller than the size of the inlet 2111*b*.

The filtering member 232 of the filter 23 may be provided in a substantially cylindrical shape. The filtering member 232 may be provided as a mesh filter 23.

The material of the filter 23 may be provided in various ways according to a degree to which the washing water is to be filtered. The filter 23 may be replaced by disassembling the upper body 2111 and the lower body 2112 of the separation device 2.

The filter 23 may be arranged inside the housing 21 to surround the outside of the conveyor screw 22. Accordingly, in the washing water flowing into the inlet member 2111*a*, food waste corresponding to large particles remains inside the filter 23, and water corresponding to small particles is discharged to the outside of the filter 23.

The food waste remaining in the filter 23 may be transferred toward the discharge nozzle 212 according to the rotation of the conveyor screw 22. In addition, the filtered water discharged to the outside of the filter 23 may flow to the liquid discharge tube 2112*a* formed in the lower body 2112. The water filtered by the filter 23 may be introduced back into the dishwasher D through the circulation pipe P3 connected to the liquid discharge tube 2112*a*.

In the separation device 2, the outlet 2121 of the discharge nozzle 212 may be formed in the rotation axis direction of the conveyor screw 22, and the liquid discharge tube 2112*a* may be formed in a radial direction of the rotational axis of the conveyor screw 22.

The conveyor screw 22 may be provided to rotate in a direction horizontal to the ground. Therefore, the conveyor screw 22 may push out solid food waste using a separate driving source, while liquid water is naturally discharged by gravity.

FIGS. 1, 2 and 6 illustrate that the separation device 2 is arranged horizontally with respect to the storage container 1 to transfer the food waste to the horizontal direction and the water separated from the food waste is discharged to the lower side of the separation device 2 by gravity. However, the arrangement of the separation device 2 is not limited thereto.

For example, the separation device 2 may be arranged perpendicular to the storage container 1 to transport food waste toward a vertical direction, and water separated from the food waste may be discharged toward the vertical direction. In this case, the conveyor screw 22 of the separation device 2 may be provided to rotate about a rotation axis in the vertical direction.

Figure 7:
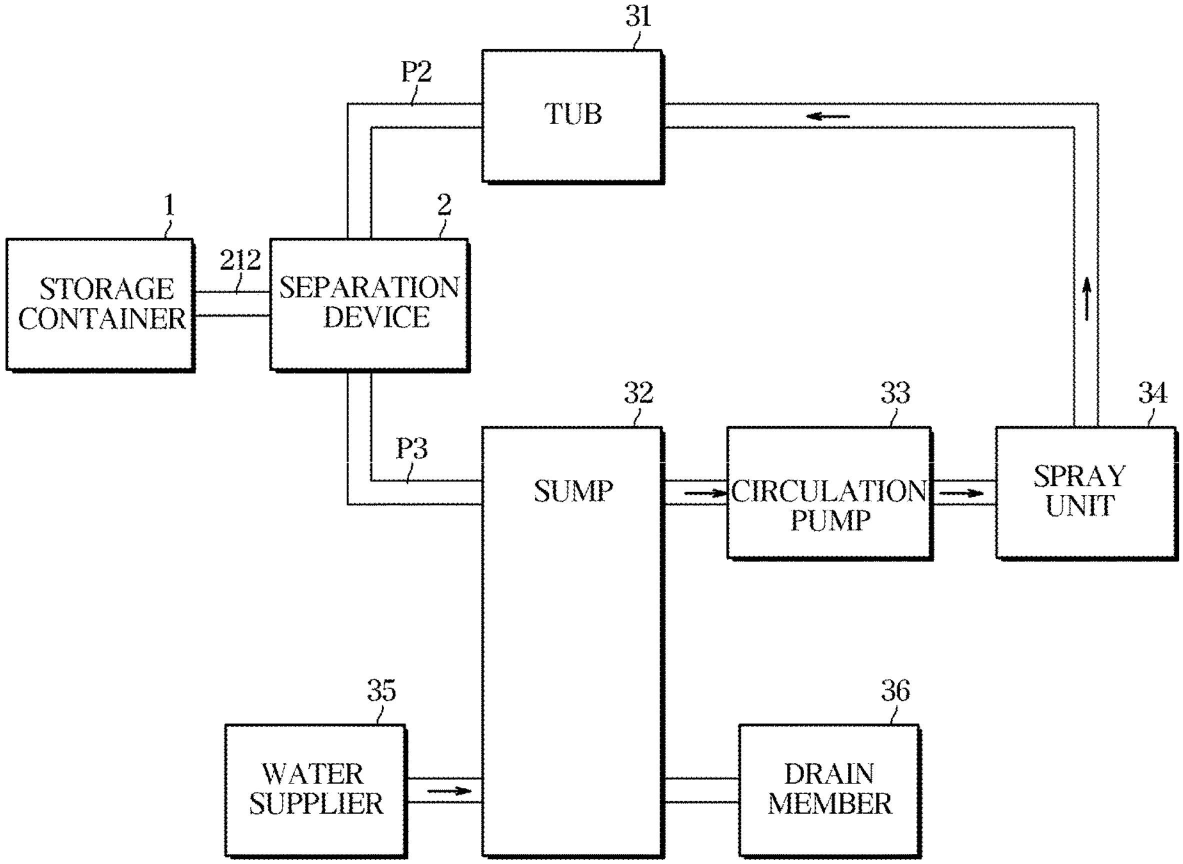
FIG. 7 is a diagram illustrating a flow of washing water when a dishwasher starts to operate, in the food waste disposer according to an embodiment of the disclosure.
Figure 8:
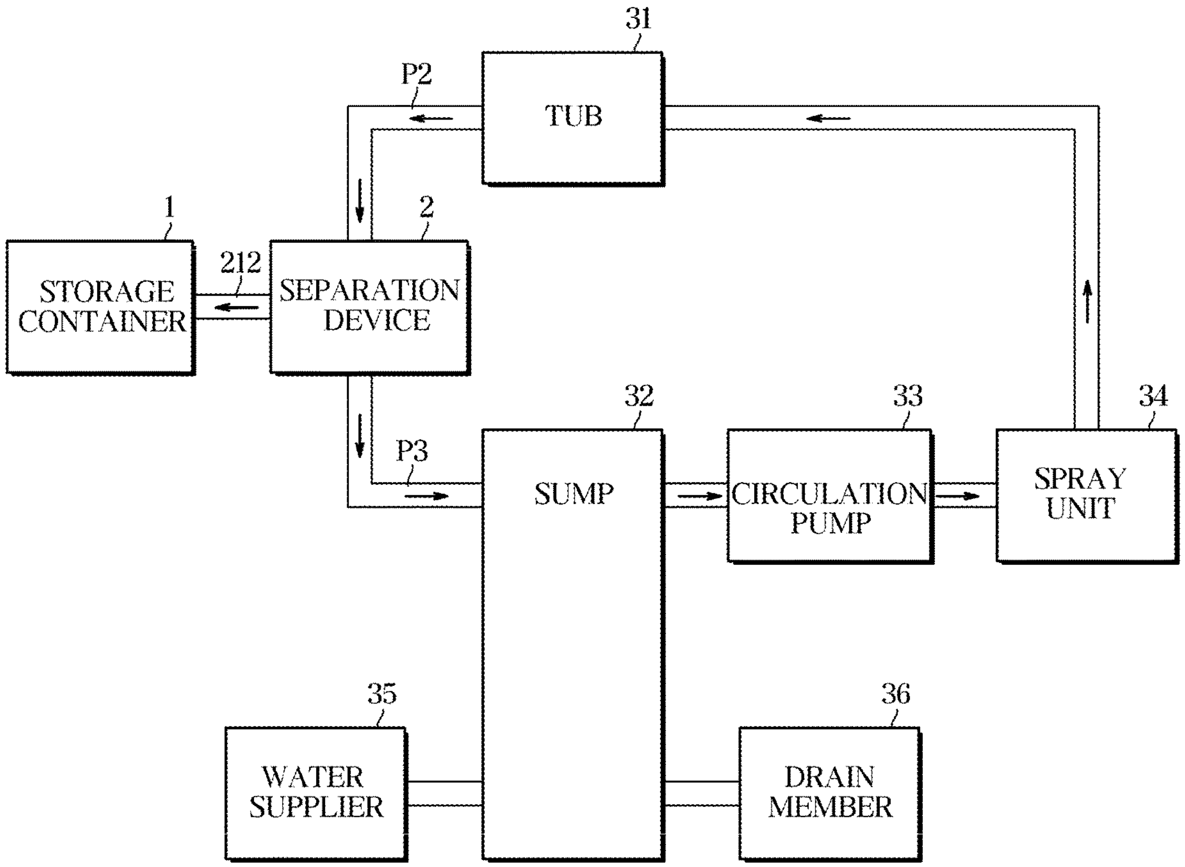
FIG. 8 is a diagram illustrating a flow of food waste and water in a circulation mode of the dishwasher, in the food waste disposer according to an embodiment of the disclosure.
Figure 9:
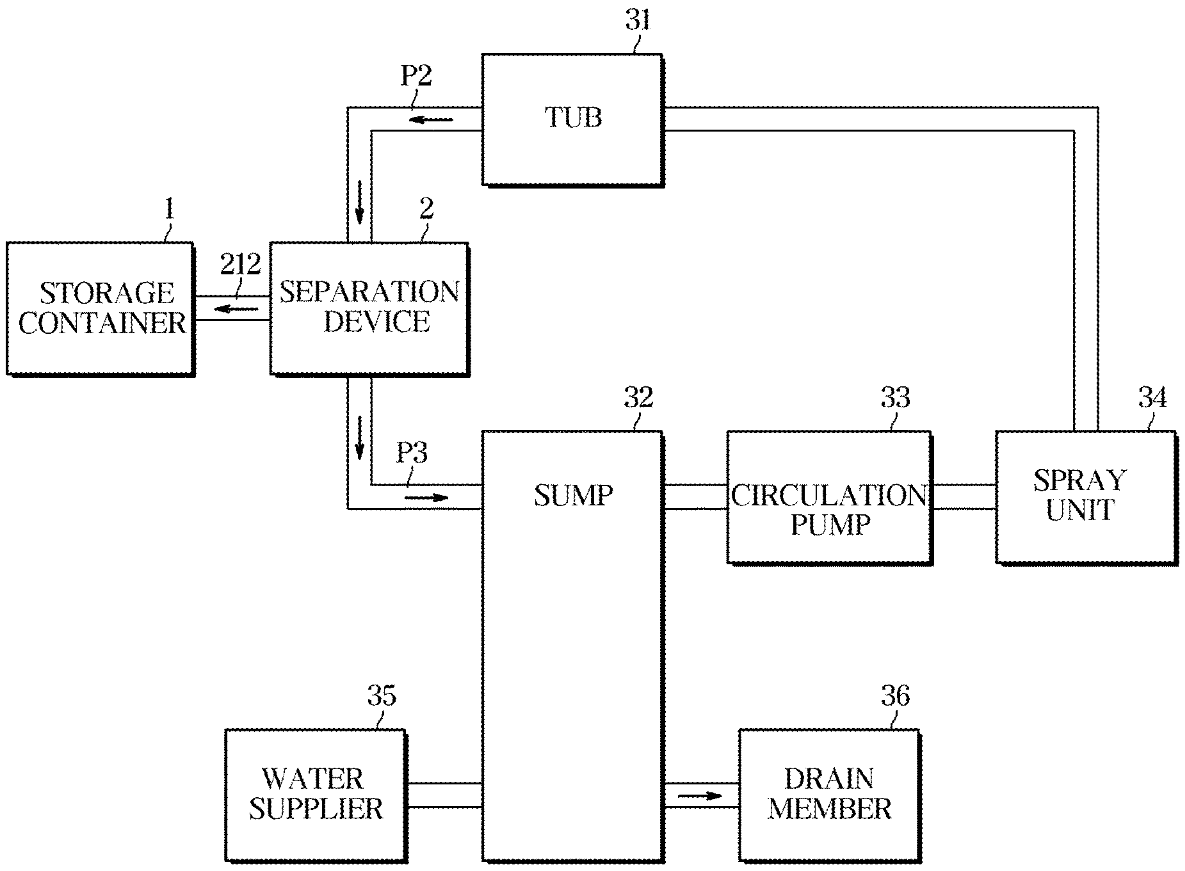
FIG. 9 is a diagram illustrating a flow of food waste and water in response to termination of the circulation mode of the dishwasher, in the food waste disposer according to an embodiment of the disclosure.

FIG. 7 is a diagram illustrating a flow of washing water when a dishwasher starts to operate, in the food waste disposer according to an embodiment of the disclosure. FIG. 8 is a diagram illustrating a flow of food waste and water in a circulation mode of the dishwasher, in the food waste disposer according to an embodiment of the disclosure. FIG. 9 is a diagram illustrating a flow of food waste and water in response to termination of the circulation mode of the dishwasher, in the food waste disposer according to an embodiment of the disclosure.

Referring to FIGS. 7 to 9, the transfer pipe P2 and the circulation pipe P3 of the food waste disposer F according to an embodiment may be connected to the dishwasher D. Particularly, the transfer pipe P2 may be connected to a tub 31 of the dishwasher D, and the circulation pipe P3 may be connected to the sump 32 of the dishwasher D.

The dishwasher D may be provided to form a washing chamber in which dishes are washed.

The transfer pipe P2 may be connected to the lower portion of the tub 31 so as to transfer the washing water collected on a bottom surface of the tub 31. A separate tubular outlet or the like may be provided under the tub 31 for coupling the tub 31 and the transfer pipe P2. Further, the bottom surface of the tub 31 may be inclined at a predetermined angle to facilitate collection of washing water.

The sump 32 of the dishwasher D may be provided to store washing water. The sump 32 may be connected to a circulation pump 33. The circulation pump 33 may be connected to a spray unit 34.

The circulation pump 33 may pump washing water stored in the sump 32 and supply the washing water to the spray unit 34. The spray unit 34 may be arranged inside the tub 31 to wash dishes accommodated in the washing chamber. The circulation pump 33 and the spray unit 34 may be connected through a washing water supply pipe or the like.

The sump 32 of the dishwasher D may be connected to an external water supplier 35 to receive water for washing. In addition, the sump 32 may be connected to an external drain member 36 to discharge washing water to the drain member 36 in response to termination of the washing of the dishwasher D or termination of a circulation mode.

Although not shown, the sump 32, the circulation pump 33, the water supplier 35, and the drain member 36 may be connected to each other through pipes, and may include a valve configured to open and close the pipes. Opening and closing of the valve may be controlled by a controller (not shown).

The transfer pipe P2 of the food waste disposer F according to an embodiment may connect the tub 31 of the dishwasher D to the separation device 2. In addition, the circulation pipe P3 may connect the sump 32 of the dishwasher D to the separation device 2.

In response to the washing water of the dishwasher D, including food waste, flowing from the transfer pipe P2 into the separation device 2, the separation device 2 may separate the food waste and discharge the food waste to the storage container 1 through the discharge nozzle 212.

Hereinafter an operation of the food waste disposer F according to an operation of the dishwasher D will be described.

Referring to FIG. 7, in response to starting the operation of the dishwasher D, washing water is supplied from the water supplier 35 to the sump 32 of the dishwasher D. At this time, the washing water is clean washing water that is not contaminated, that is the water in which dishes are not washed.

The washing water may be collected in the sump 32 and pumped by the circulation pump 33, and the pumped washing water may be supplied to the inside of the tub 31 through the spray unit 34. Accordingly, the dishes stored inside the tub 31 may be washed.

Referring to FIG. 8, washing water including food waste may be collected on the bottom surface of the tub 31 while dishes are washed inside the tub 31. The washing water including food waste may be transferred to the separation device 2 through the transfer pipe P2 connected to the tub 31.

The washing water including the food waste may be pumped by the pump P1 mounted on the transfer pipe P2, and transferred to the separation device 2.

The washing water including the food waste, which is transferred to the separation device 2, may be introduced into the inlet member 2111*a* of the separation device 2 through the transfer pipe P2. The washing water introduced into the inlet member 2111*a* of the separation device 2 may flow into the filter 23 of the separation device 2.

Solid food waste in the washing water introduced into the filter 23 may remain inside the filter 23 without passing through the filter 23.

The food waste remaining on the filter 23 may be transferred from the housing body 211 of the separation device 2 toward the discharge nozzle 212 by the rotation of the conveyor screw 22 rotatably arranged inside the filter 23.

The food waste transferred to the discharge nozzle 212 is discharged to the outside of the separation device 2 through the outlet 2121 formed at the end of the discharge nozzle 212.

Because the outlet 2121 of the separation device 2 is formed to be spaced apart from the grinding device 100 of the storage container 1 by a predetermined distance, the food waste discharged through the outlet 2121 may fall into the separation device 2 of the storage container 1 due to gravity. Particularly, the food waste may be collected into the grinding case 110 of the grinding device 100 through the opening 412 of the upper frame 41 of the storage container 1.

The food waste collected in the grinding device 100 of the storage container 1 may be heated by the heat generator 60 arranged under the grinding device 100, and stirred and grinded through the grinder inside the grinding device 100, and then transferred to the storage device 80 arranged under the grinding device 100.

Thereafter, a user can remove the dried and grinded food waste by separating only the storage device 80 from the storage container 1.

At the same time, liquid water in the washing water introduced into the filter 23 of the separation device 2 may pass through the filter 23 and be discharged to the liquid discharge tube 2112*a* of the separation device 2, and introduced into the sump 32 of the dishwasher D through the circulation pipe P3 connected to the liquid discharge tube 2112*a*.

The water introduced back to the sump 32 of the dishwasher D may be pumped by the circulation pump 33 and sprayed into the tub 31 through the spray unit 34. This circulation process may be repeated several times, which may be referred to as a circulation mode of the dishwasher D.

Referring to FIG. 9, in response to the termination of the circulation mode of the dishwasher D, the water separated by the separation device 2 may no longer circulate in the dishwasher D.

Particularly, the washing water including food waste may be transferred from the tub 31 to the separation device 2 through the transfer pipe P2.

In this case, the washing water including food waste may be pumped by the pump P1 mounted on the transfer pipe P2 and transferred to the separation device 2.

The washing water including the food waste transferred to the separation device 2 may be introduced into the inlet member 2111*a* of the separation device 2 through the transfer pipe P2. The washing water flowing into the inlet member 2111*a* of the separation device 2 may flow into the filter 23 of the separation device 2.

Solid food waste in the washing water introduced into the filter 23 may remain inside the filter 23 without passing through the filter 23. The food waste remaining on the filter 23 may be transferred from the housing body 211 of the separation device 2 toward the discharge nozzle 212 by the rotation of the conveyor screw 22 rotatably arranged inside the filter 23.

The food waste transferred to the discharge nozzle 212 is discharged to the outside of the separation device 2 through the outlet 2121 formed at the end of the discharge nozzle 212.

Because the outlet 2121 of the separation device 2 is formed to be spaced apart from the grinding device 100 of the storage container 1 by a predetermined distance, the food waste discharged through the outlet 2121 may fall into the separation device 2 of the storage container 1 due to gravity. Particularly, the food waste may be collected into the grinding case 110 of the grinding device 100 through the opening 412 of the upper frame 41 of the storage container 1.

The food waste collected in the grinding device 100 of the storage container 1 may be heated by the heat generator 60 arranged under the grinding device 100, and stirred and grinded through the grinder inside the grinding device 100, and then transferred to the storage device 80 arranged under the grinding device 100.

Thereafter, a user can remove the dried and grinded food waste by separating only the storage device 80 from the storage container 1.

At the same time, liquid water in the washing water introduced into the filter 23 of the separation device 2 may pass through the filter 23 and be discharged to the liquid discharge tube 2112*a* of the separation device 2, and introduced into the sump 32 of the dishwasher D through the circulation pipe P3 connected to the liquid discharge tube 2112*a*, which is the same as the performance of the circulation mode of the dishwasher D.

However, in response to the termination of the circulation mode of the dishwasher D, the water flowing into the sump 32 of the dishwasher D flows to the drain member 36 without being pumped by the circulation pump 33. Accordingly, the water is no longer circulated and used for washing, but is discharged to the outside of the dishwasher D through the drain member 36.

In addition, the food waste disposer F according to an embodiment may include a controller (not shown) configured to control the pump P1 to be operated in response to detecting washing water by a sensor mounted to the end of the transfer pipe P2 connected to the tub 31.

In addition, the controller (not shown) may be configured to control the motor 24 of the separation device 2. Accordingly, in response to the operation of the pump 21, the washing water may be introduced into the separation device 2, and thus the controller (not shown) may control the motor 24 to be operated in conjunction with the operation of the pump 21.

In addition, the controller (not shown) may also control the operation of the storage container 1.

The storage container 1 may be operated in various ways. For example, the controller (not shown) may control the storage container 1 to be operated in response to a weight of food waste, which is collected in the grinding device of the storage container 1, being greater than or equal to a predetermined weight. Alternatively, the controller (not shown) may control the storage container 1 to be operated whenever the dishwasher D performs washing in conjunction with the driving of the dishwasher D. Alternatively, the storage container 1 may be operated manually by a user.

The storage container 1 may receive food waste directly from a user as well as the storage container 1 may dispose of the food waste discharged from the separation device 2, as mentioned above.

For example, the user may put the food waste into the grinding device 100 inside the storage container 1 by holding a cover member (not shown) provided to open and close the opened upper portion of the storage container 1.

Alternatively, because the grinding device 100 of the storage container 1 is removable to the outside of the storage container 1, a user can separate the grinding device 100 from the storage container 1, put food waste into the storage container 1 and then install the grinding device 100 to the storage container 1, again.

Therefore, when installing the storage container 1 to inside a lower cabinet of the kitchen, it is required to allow the storage container 1 to be spaced apart from an upper surface of the lower cabinet by a predetermined distance in order to take out the grinding device through the upper side of the storage container 1.

In addition, the separation device 2 may be mounted on the storage container 1 such that the separation device 2 does not interfere with the grinding device 100 when the grinding device 100 is separated from the outer housing 10 of the storage container 1. Particularly, the separation device 2 may be mounted on one side of the storage container 1 and arranged so as not to overlap a movement path of the grinding device 100 as much as possible.

However, the mounting method of the separation device 2 is not limited thereto. For example, the separation device 2 may be arranged to be moved in a horizontal direction with respect to the storage container 1 and thus, when separating the grinding device 100 from the storage container 1, the separation device 2 may be moved to the outside of the storage container 1 so as not to interfere with the grinding device 100.

Alternatively, the separation device 2 may be rotatably mounted with respect to the storage container 1, and thus when separating the grinding device 100 from the storage container 1, the separation device 2 may be rotated to the outside of the storage container 1 so as not to interfere with the grinding device 100.

In addition, in the food waste disposer F according to an embodiment, the pump P1 is mounted on the transfer pipe P2, and thus there is no limitation in a location where the dishwasher D is arranged. Particularly, the separation device 2 is mounted above the storage container 1 and thus the food waste discharged from the separation device 2 is collected in the storage container 1. Therefore, the separation device 2 may be mounted to the storage container 1 at a height similar to a height of the storage container 1.

When the dishwasher D is placed on the bottom surface at the same height as the storage container 1, a height difference occurs between the lower portion of the tub 31 of the dishwasher D and the separation device 2.

Accordingly, by installing the pump P1 to the transfer pipe P2 connecting the lower portion of the tub 31 of the dishwasher D to the inlet member 2111*a* of the separation device 2, the food waste generated from the dishwasher D may be easily transported even when the dishwasher D is arranged relatively further from the separation device 2 or the dishwasher D is arranged at a lower than or the same as the height the separation device 2.

The food waste disposer F according to an embodiment may be connected to the dishwasher D to separate food waste included in the washing water of the dishwasher D into the storage container 1, and transfer the water included in the washing water back to the sump 32 of the dishwasher D. Therefore, the food waste disposer F may replace the role of the filter 23 of the dishwasher D.

Accordingly, there is no need for the user to additionally remove the food waste collected in the filter 23, and the storage container 1 automatically disposes of the separated food waste, thereby increasing the convenience of use.

In addition, because the food waste flowing into the storage container 1 is in a state in which moisture is removed as much as possible by the separation device 2, it is possible to minimize energy consumed for disposing of the food waste in the storage container 1.

Figure 10:
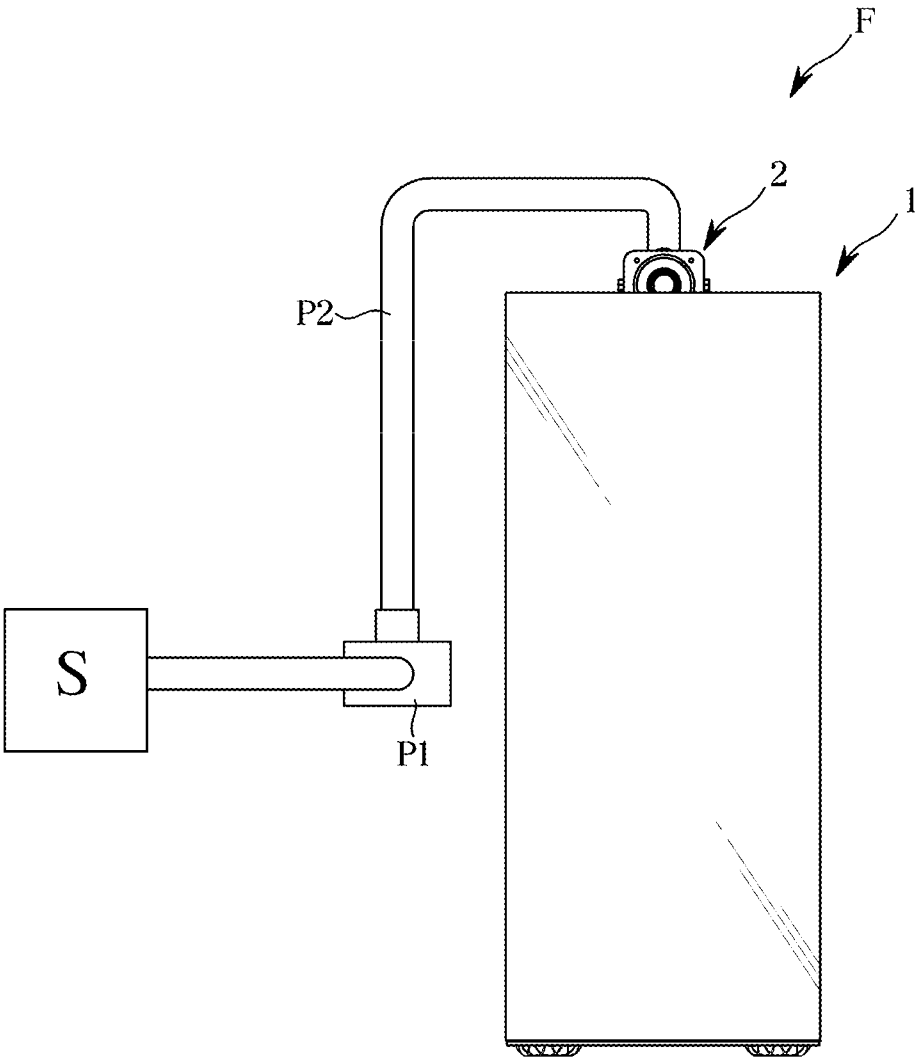
FIG. 10 is a front view schematically illustrating a food waste disposer according to another embodiment of the disclosure.

FIG. 10 is a front view schematically illustrating a food waste disposer according to another embodiment of the disclosure.

Referring to FIG. 10, the food waste disposer according to another embodiment may be connected to the sink S, unlike the food waste disposer according to an embodiment. Particularly, the transfer pipe P2 of the food waste disposer according to another embodiment may be connected to the drain pipe of the sink S.

The food waste disposer may include the transfer pipe P2 connected to the drain pipe of the sink.

Particularly, as a user washes dishes in the sink S, food waste and water may be included.

The food waste and water discharged from the sink S may be transferred from the drain pipe of the sink S to the transfer pipe P2 of the food waste disposer.

The food waste disposer may include the pump P1 mounted on the transfer pipe P2.

The pump P1 may be configured to provide power to transfer food waste and water to the transfer pipe P2. The pump P1 may be mounted in the middle of the transfer pipe P2, as shown in FIG. 10. However, a position of the pump P1 is not limited thereto, and the pump P1 may be mounted on an upstream side-end of the transfer pipe or a downstream-end of the transfer pipe P2.

The food waste disposer may include the separation device 2 connected to the transfer pipe P2 to separate food waste and water discharged from the sink S. The food waste disposer may include the storage container 1 in which food waste is discharged from the separation device 2 and stored.

Food waste and water transferred to the transfer pipe P2 by the pump P1 may be introduced into the separation device 2. The separation device 2 may be mounted above the storage container 1. Particularly, the discharge nozzle 212 of the separation device 2 may be arranged on the upper side of the storage container 1.

Food waste, which is separated from the water and discharged from the separation device 2, may be introduced into the storage container 1 through an open upper surface of the storage container 1. The food waste separated by the separation device 2 may be stored in the storage container 1 by gravity.

However, the disclosure is not limited thereto. Alternatively, as the outlet of the separation device 2 is connected to one end of the discharge pipe, and the other end of the discharge pipe is arranged inside the storage container 1, food waste may be introduced into the storage container 1 through the discharge pipe.

In addition, although not shown, the cover member (not shown) provided to open and close a part of the separation device 2 and the open upper surface of the storage container 1 may be provided. By the cover member (not shown), it is possible to prevent odors, caused by the food waste, from leaking to the outside.

The cover member (not shown) may be rotatably coupled to the storage container 1 using a hinge, coupled to the storage container 1 in a sliding manner, or detachably provided without being coupled to the storage container 1.

Unless otherwise specified, configurations of the separation device and the storage container may be provided in the same manner as the separation device 2 and the storage container 1 of the food waste disposer F according to an embodiment, and may include the same reference numerals.

Particularly, in the food waste disposer according to another embodiment, the liquid discharge tube of the separation device 2 may be connected to the drain pipe of the sink S or to another drain pipe, and thus water separated by the separation device 2 may be discharged into the sewer, which is unlike the food waste disposer according to an embodiment.

That is, unlike the food waste disposer according to an embodiment, the food waste disposer according to another embodiment may not include the circulation pipe P3.

Further, in the food waste disposer according to another embodiment, the sink S may include another type of food waste disposer.

For example, a food waste disposer installed in connection with a drain hole of the sink S may be provided under the sink S. The food waste disposer may be provided to quickly grind the food waste introduced into the drain hole of the sink S, using a high-speed grinding blade or the like, and then discharge the food waste together with water into a pipe.

In this case, the food waste disposer according to another embodiment is configured to allow finely grinded food waste and water to be transferred through the transfer pipe P2 and introduced into the separation device 2. Accordingly, the food waste separated by the separation device 2 may have a smaller particle, and thus it is possible to more quickly dispose of the food waste in the storage container 1.

In the food waste disposer according to another embodiment, food waste introduced into the sink S or food waste generated in the drain member of the sink S may be transferred to the separation device 2 and collected into the storage container 1 through the separation device 2. The separated water may flow to the drain pipe of the sink S and thus it is possible to keep the drain pipe clean. That is, it is possible to prevent a state in which an odor is generated due to food waste remaining in the drain pipe, or a state in which water flows back due to food waste that blocks the drain pipe.

Figure 11:
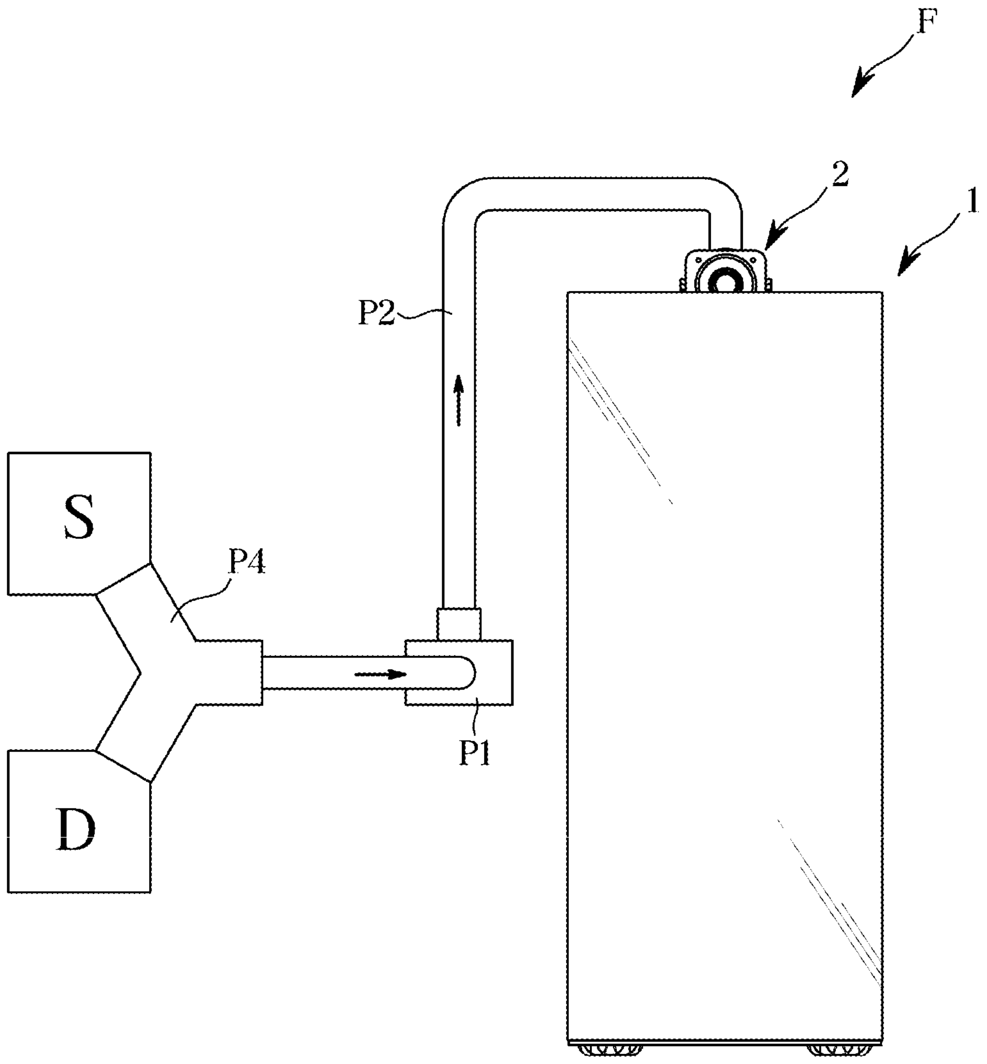
FIG. 11 is a front view schematically illustrating a food waste disposer according to still another embodiment of the disclosure.

FIG. 11 is a front view schematically illustrating a food waste disposer according to still another embodiment of the disclosure.

As illustrated in FIG. 11, a food waste disposer according to still another embodiment may include a transfer pipe P2 connected to the sink S and the dishwasher D.

Particularly, the transfer pipe P2 may be connected to the drain pipe of the sink S and the tub 31 of the dishwasher D so as to transfer food waste and water discharged from the sink S and to transfer food waste and water discharged from the dishwasher D.

The drain pipe of the sink S and the tub 31 of the dishwasher D may be connected to the transfer pipe P2 through a connection pipe P4.

The food waste disposer may include a pump P1 mounted on the transfer pipe P2.

The pump P1 may be configured to provide power to transfer food waste and water to the transfer pipe P2. The pump P1 may be mounted in the middle of the transfer pipe P2, as shown in FIG. 11. However, a position of the pump P1 is not limited thereto, and the pump P1 may be mounted on an upstream side-end of the transfer pipe or a downstream-end of the transfer pipe P2.

The food waste disposer may include a separation device 2 connected to the transfer pipe P2 to separate food waste and water discharged from the sink S and the dishwasher D. The food waste disposer may include a storage container 1 in which food waste is discharged from the separation device 2 and stored.

Food waste and water transferred to the transfer pipe P2 by the pump P1 may be introduced into the separation device 2. The separation device 2 may be mounted above the storage container 1. Particularly, a discharge nozzle 212 of the separation device 2 may be arranged on the upper side of the storage container 1.

Food waste, which is separated from the water and discharged from the separation device 2, may be introduced into the storage container 1 through an open upper surface of the storage container 1. The food waste separated by the separation device 2 may be stored in the storage container 1 by gravity.

However, the disclosure is not limited thereto. Alternatively, as an outlet of the separation device 2 is connected to one end of the discharge pipe, and the other end of the discharge pipe is arranged inside the storage container 1, food waste may be introduced into the storage container 1 through the discharge pipe.

In addition, although not shown, a cover member (not shown) provided to open and close a part of the separation device 2 and the open upper surface of the storage container 1 may be provided. By the cover member (not shown), it is possible to prevent odors, caused by the food waste, from leaking to the outside.

The cover member (not shown) may be rotatably coupled to the storage container 1 using a hinge, coupled to the storage container 1 in a sliding manner, or detachably provided without being coupled to the storage container 1.

Unless otherwise specified, configurations of the separation device 2 and the storage container 1 may be provided in the same manner as the separation device 2 and the storage container 1 of the food waste disposer F according to an embodiment, and may include the same reference numerals.

Particularly, in the food waste disposer according to still another embodiment, a liquid discharge tube of the separation device 2 may be connected to the drain pipe of the sink S or to another drain pipe, and thus water separated by the separation device 2 may be discharged into the sewer, which is unlike the food waste disposer according to an embodiment.

Further, in the food waste disposer according to still another embodiment, the sink S may include another type of food waste disposer.

For example, a food waste disposer installed in connection with a drain hole of the sink S may be provided under the sink S. The food waste disposer may be provided to quickly grind the food waste introduced into the drain hole of the sink S, using a high-speed grinding blade or the like, and then discharge the food waste together with water into a pipe.

In this case, the food waste disposer according to still another embodiment is configured to allow finely grinded food waste and water to be transferred through the transfer pipe P2 and introduced into the separation device 2. Accordingly, the food waste separated by the separation device 2 may have a smaller particle, and thus it is possible to more quickly dispose of the food waste in the storage container 1.

In the food waste disposer according to an embodiment, in a state in which the food waste disposer is connected to only the dishwasher D, clean water may be supplied from the water supplier 35 and the water may be contaminated only during the washing process of the dishes. Therefore, it is possible to recycle the washing water.

However, in a state in which the food waste disposer according to still another embodiment is also connected to the sink S, water generated for various reasons may be introduced and discharged to the drain pipe of the sink S, and thus it is difficult to recycle the water as the washing water of the dishwasher D.

Accordingly, the food waste disposer according to still another embodiment of the disclosure may not be limited to that shown in FIG. 11. For example, the food waste disposer according to still another embodiment may be provided such that a transfer pipe P2 connected to the sink S and a transfer pipe P2 connected to the dishwasher D are provided to be separated from each other.

In this case, the inlet member 2111*a* of the separation device 2 may be provided as a plurality of inlet members to which each transfer pipe P2 is mounted.

In addition, the inside of the separation device 2 may be divided and thus the separation device 2 may include a member coupled to the transfer pipe P2 of the sink S and a member coupled to the transfer pipe P2 of the dishwasher D. Accordingly, a conveyor screw 22 may be provided in plurality to be arranged at each member.

Accordingly, one side of the separation device 2 may be connected to the sink S to separate food waste and water introduced from the sink S, and to discharge the separated water through the drain pipe. In addition, the other side of the separation device 2 may be connected to the dishwasher D to separate food waste and water introduced from the dishwasher D, and to transfer the separated water to the sump 32 of the dishwasher D.

Accordingly, it is possible to implement a food waste disposer configured to recycle the water introduced from the dishwasher D without recycling the water introduced from the sink S.

Alternatively, the separation device 2 may be provided in plurality.

One of the plurality of separation devices 2 may be connected to the drain pipe of the sink S. Another separation device 2 of the plurality of separation devices 2 may be connected to the dishwasher D.

Each separation device 2 may include the above-described housing 21, the conveyor screw 22, the filter 23, and the motor 24, and be configured to collectively dispose of food waste in a single storage container 1 while transferring and separating the food waste and water of the sink S and the dishwasher D, independently of each other.

As is apparent from the above description, it is possible to automatically transfer, separate, and dry and grind food waste mixed with water.

Further, there is no need to use a filter of a dishwasher, and thus a user does not need to manually remove food waste accumulated in the filter.

Further, it is possible to prevent food waste from being accumulated in a drain pipe of a sink, thereby keeping the drain pipe clean.

Further, it is possible to collectively collect food waste generated from a sink and food waste generated from a dishwasher into a storage container, thereby reducing the household burden on the consumer.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A food waste disposer comprising:
- a transfer pipe connectable to a tub of a dishwasher to transfer washing water containing food waste discharged from the tub of the dishwasher therethrough;
- a separation device connectable to the transfer pipe to separate the food waste from the washing water transferred from the transfer pipe;
- a storage container detachably coupled to the separation device to receive the separated food waste from the separation device and to dispose the received separated food waste;
- a pump to be installed to the transfer pipe to pump the washing water and the food waste to be transferred to the separation device which is located higher than the pump;
- a sensor mounted to an end of the transfer pipe connected to the tub;
- a controller configured to control the pump to be operated in response to detecting washing water by the sensor; and
- a circulation pipe respectively connectable to the separation device and a sump of the dishwasher to transfer the washing water separated from the food waste by the separation device to the sump therethrough, wherein in response to turning on a circulation mode in the dishwasher, the washing water separated from the food waste is circulated by being introduced into the sump of the dishwasher from the separation device through the circulation pipe, and then being re-introduced into the tub of the dishwasher by a circulation pump of the dishwasher which is connected to the sump.

2. The food waste disposer of claim 1, wherein in response to turning off the circulation mode of the dishwasher, the washing water introduced into the sump is discharged to a drain member of the dishwasher which is connected to the sump.

3. The food waste disposer of claim 1, wherein the separation device comprises:
- a housing;
- a conveyor screw rotatably installed inside the housing to transfer the separated food waste to the storage container; and
- a filter arranged between the housing and the conveyor screw to separate water from the food waste and filter the separated water.

4. The food waste disposer of claim 3, wherein the housing comprises:
- a housing body; and
- a discharge nozzle arranged above the storage container, and having an outlet to discharge the separated food waste to the storage container.

5. The food waste disposer of claim 4, wherein the housing body comprises:
- an inlet extending in a first direction with respect to the housing body and connectable to the transfer pipe to introduce the transferred washing water; and
- a liquid discharge tube extending in a second direction which is an opposite direction of the first direction to discharge the water separated by the filter.

6. The food waste disposer of claim 5, wherein the outlet of the discharge nozzle is formed in a rotation axis direction of the conveyor screw and the liquid discharge tube is formed in a radial direction of the conveyor screw.

7. The food waste disposer of claim 4, wherein the discharge nozzle comprises:
- a body coupler coupled to the housing body; and
- a nozzle comprising a cross section gradually reduced from the body coupler toward the outlet.

8. The food waste disposer of claim 3, wherein the separation device further comprises a motor configured to supply power to the conveyor screw to rotate the conveyor screw.

9. The food waste disposer of claim 1, wherein the storage container comprises:
- an outer housing; and
- a grinding device detachably installed from an inside of the outer housing to an outside of the outer housing and configured to grind the food waste discharged from the separation device.

10. The food waste disposer of claim 9, wherein the separation device is biasedly mounted to one side of the storage container not to interfere with the grinding device when the grinding device is separating from the outer housing.

11. The food waste disposer of claim 9, wherein the storage container further comprises a deodorizer arranged on one side of the grinding device to suck odors generated by the grinding device and to discharge the odors to the outside.

12. The food waste disposer of claim 1, wherein the transfer pipe is connected to a drain pipe of a sink to directly transfer the food waste and water from the sink.

13. A food waste disposer comprising:

a transfer pipe connectable to both a drain pipe of a sink and a tub of a dishwasher respectively to transfer washing water including food waste discharged from the sink and to transfer washing water including food waste discharged from the dishwasher therethrough;

a separation device connectable to the transfer pipe to separate the food waste from the washing water transferred from the transfer pipe;

a storage container to which the separation device is coupled to one side thereof, the storage container including a grinding device configured to grind the separated food waste discharged from the separation device;

a pump mountable to the transfer pipe to pump the washing water from the drain pipe of the sink and the washing water from the tub of the dishwasher to be transferred to the separation device which is located higher than the pump;

a sensor mounted to an end of the transfer pipe connected to the tub;

a controller configured to control the pump to be operated in response to detecting washing water by the sensor; and a circulation pipe respectively connectable to the separation device and a sump of the dishwasher to transfer the washing water separated from the food waste by the separation device to the sump therethrough, wherein in response to turning on a circulation mode in the dishwasher, the washing water separated from the food waste is circulated by being introduced into the sump of the dishwasher from the separation device through the circulation pipe, and then being re-introduced into the tub of the dishwasher by a circulation pump of the dishwasher which is connected to the sump.

14. The food waste disposer of claim 13, wherein the storage container further includes an outer housing, and the separation device is placed inside the outer housing and detachably coupled to the outer housing.

* * * * *